US010194485B2

United States Patent
Kaplita et al.

(10) Patent No.: US 10,194,485 B2
(45) Date of Patent: Jan. 29, 2019

(54) METHOD AND APPARATUS FOR AUTOMATED DISPATCH OF MOBILE DEVICES IN A COMMUNICATION SYSTEM

(71) Applicant: MOTOROLA SOLUTIONS, INC, Chicago, IL (US)

(72) Inventors: Grzegorz Kaplita, Rzeszow (PL); Jacek Maciej Kaczynski, Czernichow (PL); Marta Tatiana Musik, Rybnik (PL); Mikolaj Pudo, Chrzanow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/507,011

(22) PCT Filed: Dec. 18, 2014

(86) PCT No.: PCT/PL2014/000144
§ 371 (c)(1),
(2) Date: Feb. 27, 2017

(87) PCT Pub. No.: WO2016/099302
PCT Pub. Date: Jun. 23, 2016

(65) Prior Publication Data
US 2017/0278378 A1    Sep. 28, 2017

(51) Int. Cl.
*G08B 25/00*    (2006.01)
*G08B 27/00*    (2006.01)
(Continued)

(52) U.S. Cl.
CPC .......... *H04W 76/50* (2018.02); *G08B 25/001* (2013.01); *G08B 25/005* (2013.01);
(Continued)

(58) Field of Classification Search
None
See application file for complete search history.

(56) References Cited

U.S. PATENT DOCUMENTS 7,697,558 B2    4/2010  Pilon et al.
7,911,334 B2    3/2011  Busey
(Continued)

FOREIGN PATENT DOCUMENTS

EP    1440592 B1    4/2009
WO    2005002251 A1    1/2005
(Continued)

OTHER PUBLICATIONS

The International Search Report and the Written Opinion, corresponding patent application No. PCT/PL2014/000144, filed Dec. 18, 2014, all pages.

*Primary Examiner* — Chico A Foxx

(57) ABSTRACT

A method and apparatus for automated dispatch of mobile devices is provided herein. An infrastructure controller device receives one of an alert and request for a response with respect to an associated location and identifies a first set of mobile devices for responding to the one of the alert and request. The device transmits a first dispatch request to each mobile device in the first set requesting dispatch to the associated location. The device subsequently identifies a higher priority mobile device for responding to the one of the alert and request relative to a lower priority mobile device. Responsive to this identification, the device transmits a second dispatch request to the higher priority mobile device requesting dispatch to the associated location, and further transmits a recall notice to the lower priority mobile device withdrawing the first dispatch request to the lower priority mobile device.

20 Claims, 4 Drawing Sheets

(51) Int. Cl.
*G08B 25/01* (2006.01)
*H04W 76/50* (2018.01)
*H04W 4/90* (2018.01)
*H04W 76/34* (2018.01)

(52) U.S. Cl.
CPC .......... *G08B 25/014* (2013.01); *G08B 27/001* (2013.01); *H04W 4/90* (2018.02); *H04W 76/34* (2018.02)

(56) References Cited

U.S. PATENT DOCUMENTS

| | | | |
|---|---|---|---|
| 8,494,481 B1 | 7/2013 | Bacco et al. | |
| 8,509,729 B2 | 8/2013 | Shaw | |
| 8,780,512 B2 | 7/2014 | Sullivan | |
| 9,505,494 B1* | 11/2016 | Marlow | B64C 39/024 |
| 2004/0212505 A1 | 10/2004 | Dewing et al. | |
| 2009/0054029 A1* | 2/2009 | Hogberg | H04L 41/5006 |
| | | | 455/404.2 |
| 2009/0284348 A1* | 11/2009 | Pfeffer | G08B 25/006 |
| | | | 340/7.3 |
| 2009/0296688 A1 | 12/2009 | Bakker et al. | |
| 2009/0313046 A1* | 12/2009 | Badgett | G06F 19/327 |
| | | | 705/3 |
| 2010/0158202 A1 | 6/2010 | Johnson et al. | |
| 2011/0071880 A1 | 3/2011 | Spector | |
| 2011/0281547 A1 | 11/2011 | Cordero | |
| 2014/0002241 A1 | 1/2014 | Elghazzawi | |
| 2014/0057645 A1 | 2/2014 | Chowdhary et al. | |
| 2014/0065999 A1 | 3/2014 | Dabbs, III et al. | |
| 2014/0368601 A1* | 12/2014 | deCharms | H04W 4/021 |
| | | | 348/14.02 |
| 2015/0261769 A1* | 9/2015 | Ono | G06F 17/3087 |
| | | | 707/724 |
| 2015/0310380 A1* | 10/2015 | Acres | G06Q 10/063116 |
| | | | 705/7.16 |
| 2016/0088455 A1* | 3/2016 | Bozik | H04W 4/90 |
| | | | 370/225 |
| 2017/0265045 A1* | 9/2017 | Igumnov | H04W 4/90 |

FOREIGN PATENT DOCUMENTS

| | | |
|---|---|---|
| WO | 2009136259 A2 | 11/2009 |
| WO | 2011060388 A1 | 5/2011 |
| WO | 2011069170 A1 | 6/2011 |

* cited by examiner

METHOD AND APPARATUS FOR AUTOMATED DISPATCH OF MOBILE DEVICES IN A COMMUNICATION SYSTEM

This application is a National Stage filing under 35 USC § 371 of co-pending Patent Cooperation Treaty international application having Serial No. PCT/PL14/00144 (the 'PCT international application') filed on Dec. 18, 2014. This application claims priority to the PCT international application, the entire contents of which are incorporated herein by reference.

BACKGROUND OF THE INVENTION

Emergencies can arise from a number of causes including medical emergencies, fires, gas leaks, chemical spills, natural disasters, crimes, and terrorist attacks to name a few. Various communication systems are used to facilitate first responder communications during responses to such emergencies. Emergency alert systems are deployed in communication systems to signal alerts (e.g. alarms) when emergency situations occur. Communication systems often employ dispatchers to assess the emergency situations when such alerts or requests for responses are signaled and subsequently summon emergency responders for responding to the alerts. Dispatchers may identify which emergency responders should be informed of the emergencies. However, the dispatchers often have to handle several emergency events at a time and this may cause time delay between the occurrence of the emergency event and dispatch of the identified emergency responders. This time delay is even more significant in time critical situations where emergency responders are required to be rapidly mobilized for providing response to the emergencies.

Accordingly, there is a need for a solution to improve the dispatching process during emergency events.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
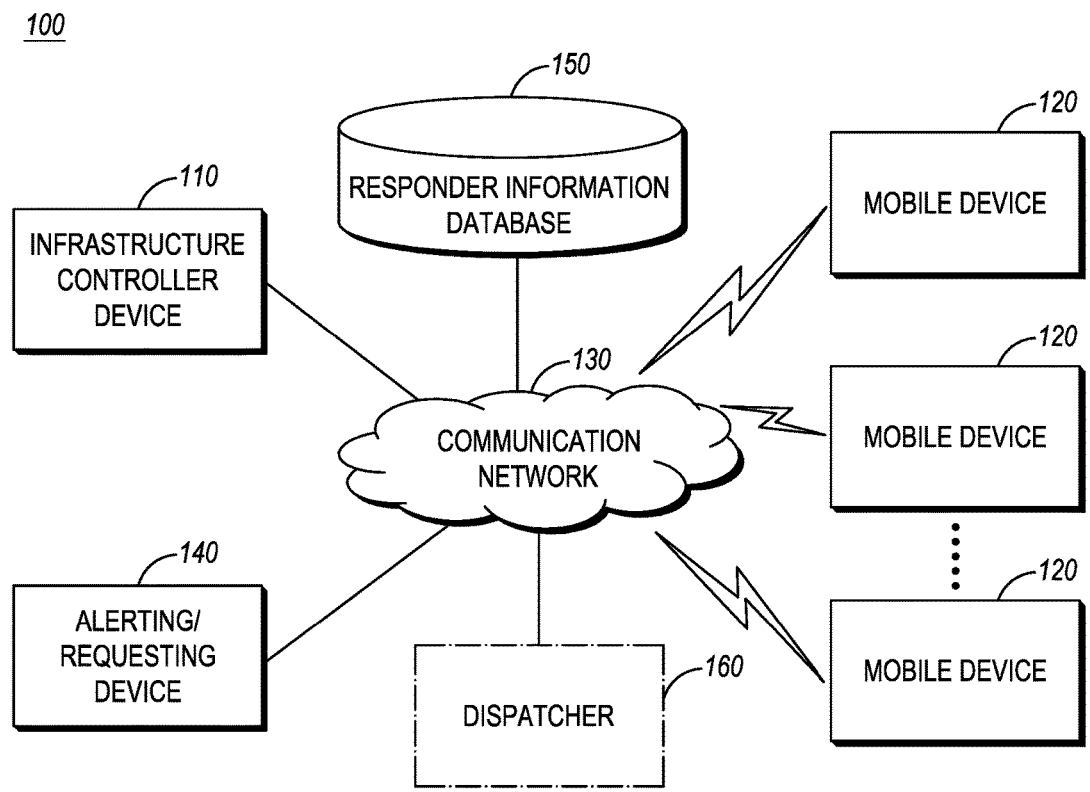
FIG. 1 is a block diagram of a communication system in accordance with an embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

A method and apparatus for automated dispatch of mobile devices is provided herein. In this method, an infrastructure controller device receives one of an alert and request for a response with respect to an associated location and identifies a first set of mobile devices for responding to the one of the alert and request. The infrastructure controller device transmits a first dispatch request to each mobile device in the first set requesting dispatch to the associated location. The infrastructure controller device subsequently identifies a higher priority mobile device for responding to the one of the alert and request relative to a lower priority mobile device in the first set of mobile devices. Responsive to this identification, the device transmits a second dispatch request to the higher priority mobile device requesting dispatch to the associated location, and further transmits a recall notice to the lower priority mobile device withdrawing the first dispatch request to the lower priority mobile device.

FIG. 1 is a block diagram illustrating a communication system 100 in accordance with an embodiment. The communication system 100 includes a plurality of communication nodes including an infrastructure controller device 110, a plurality of mobile devices 120, an alerting/requesting device 140, responder information database 150, and a dispatcher 160 that all communicate with each other via one or more communication networks 130. The mobile device 120 is assigned to a user, for example, a responder for communicating with the infrastructure controller device 110. In one embodiment, the mobile devices 120 include devices that are also commonly referred to as access terminals, mobile radios, two-way radios, handheld devices, mobile stations, cellular phones, wireless communication devices, user equipment, or any other device capable of operating in a wireless environment. In one embodiment, the mobile devices 120 represent wireless devices and/or accessories that are worn on or about a responder's body or incorporated into responder vehicles. The responder may be associated with one or more service agencies that provide response services for any event or incident that requires dispatch of responders to an associated location. Service agencies include, but are not limited to fire departments, police, rescue teams, hospitals, and other departments responsible for responding to, coordinating or overseeing events requiring response services.

The communication system 100 further comprises an alerting/requesting device 140 that is deployed at one or more locations in a geographical area to report an event or incident occurring with respect at an associated location. In one embodiment, the alerting/requesting device 140 is configured to detect or receive information related to an event or incident that necessitates dispatch of emergency responders to an associated location, and further provide one of an alert and request for response with respect to the associated location to the infrastructure controller device 110. In accordance with the embodiments of the present disclosure, the term 'associated location' corresponds to location information related to an event or incident requiring response services from the responders. For example, the location information includes an address, a building, a transportation system, a department or agency, a map of the location, geographical coordinates of the location, or combination of this information. In one embodiment, the alerting/requesting device 140 employs sensors or message sources that provide a signal to the alerting/requesting device 140 whenever an event or incident meeting a predetermined criteria is detected so that the alerting/requesting device 140 can generate one of an alert and request for response for the infrastructure controller device 110 via the communication network 130. In one embodiment, the alerting/requesting device 140 optionally sends one of the alert and request for response with respect to the associated location to a dispatcher 160 in the communication system 100.

In one embodiment; the functions and capabilities of the alerting/requesting device 140 are automated using a combination of computer hardware and software. In one embodiment, the functions and capabilities of the alerting/requesting device 140 are integrated into the infrastructure controller device 110 in order for the alerting/requesting device 140 and infrastructure controller device 110 to function as a single entity. In some embodiments, the functions and capabilities of the alerting/requesting device 140 are integrated into one or more of the mobile devices 120. In this embodiment, the mobile device 120 functioning as the alerting/requesting device 140 detects or receives information related to an event or incident that necessitates dispatch of emergency responders to an associated location, and further provide one of an alert and request for response with respect to the associated location to the infrastructure controller device 110. Further, it is to be understood that the communication system 100 is only a logical representation of connections between a number of communication nodes such as infrastructure controller device 110 and mobile devices 120, and thus the communication system 100 may otherwise include a number of infrastructure controller devices 110 each performing dispatch services for different logical groups of mobile devices 120 that are distributed among multiple sites. In one embodiment, the infrastructure controller device 110 may be replaced with any other suitable device that can receive information in a signal from mobile devices 120 and also transmit information in signals to mobile devices 120 using one or more wired or wireless communication links via the communication network 130. For example, the infrastructure controller device 110 may also be implemented as part of other network infrastructure devices that include, but are not limited to, dispatch consoles, repeaters, access points, routers, servers, base stations, mobile stations, or other types of infrastructure equipment interfacing a mobile device 120 or subscriber unit in a wireless environment. In accordance with the embodiments of the disclosure, the communication network 130 includes one or more private networks, public networks, such as the Internet, wireless networks, such as satellite and cellular networks, and local area wireless networks, such as WiFi or Bluetooth networks, local area networks (LANs), wide area networks, telephone networks, such as the Public Switched Telephone Networks (PSTN), or a combination of networks.

In accordance with the embodiments of the disclosure, the infrastructure controller device 110 is configured to automate the dispatch of mobile devices 120 when one of the alert and request for response is received with respect to an associated location. The infrastructure controller device 110 is configured to request dispatch of the responders and also withdraw the dispatch request sent to one or more responders when a sufficient number of responders accept the dispatch request. In one embodiment, the infrastructure controller device 110 accesses responder information database 150 and identifies one or more responders for dispatch to a location associated with an event or incident. In one embodiment, as shown in FIG. 1, the responder information database 150 is remotely accessible to the infrastructure controller device 110 via the communication network 130. In one embodiment, a portion or whole of the responder information database 150 is stored locally at the infrastructure controller device 110. Responder information database 150 comprises responder identification parameters for a plurality of mobile devices 120 assigned to the corresponding plurality of responders. The responder identification parameters include one or more of location information of the mobile device 120, history of activities of the responder associated with the mobile device 120, availability of the responder associated with the mobile device 120, rank and role of the responder associated with the mobile device 120, and other parameters potentially impacting an ability of the responder associated with the mobile device 120 to respond to one of the alert and request for response. In one embodiment, the infrastructure controller device 110 identifies a first set of mobile devices 120 assigned to the corresponding responders from the responder information database 150 and automatically transmits a dispatch request (also referred to as a first dispatch request) to each mobile device 120 requesting dispatch of the corresponding responder to the associated location. In one embodiment, the infrastructure controller device 110 also determines a proposed action that needs to be executed by the responder in response to the dispatch request and includes a request to execute the proposed action in the dispatch request sent to each mobile device 120. For example, the proposed action may include one or more of the following actions: (i) requesting the responder to accept the dispatch request; (ii) requesting the responder to reach the location associated with the event or incident in a given time frame, (iii) requesting the responder to provide additional information, (iv) requesting the responder to perform any other tasks associated with response services etc. In response to the dispatch request, the infrastructure controller device 110 may receive response to the dispatch request from some or all of the mobile devices 120 in the first set. The response received from each mobile device 120 may include either an acceptation or rejection to execute the proposed action.

In one embodiment, if the infrastructure controller device 110 receives an acceptation to execute the proposed action from more than a predetermined number of mobile devices 120, the infrastructure controller device 110 withdraws the dispatch request sent to a certain number of mobile devices 120, for example, a number of mobile devices 120 exceeding the predetermined number. The term 'predetermined number' signifies a count of mobile devices 120 that is determined as sufficient for providing a response to a particular event or incident associated with the alert or request for response. In one embodiment, the infrastructure controller device 110 identifies mobile devices 120 for withdrawing the dispatch request on the basis of the priority levels of mobile devices 120. In one embodiment, the infrastructure controller device 110 identifies at least one higher priority mobile device relative to at least one lower priority mobile device, where a count of the at least one higher priority mobile device is equal to the predetermined number and count of the at least one lower priority mobile device is equal to the number exceeding the predetermined number. The infrastructure controller device 110 subsequently transmits a recall notice to the at least one lower priority mobile device withdrawing the dispatch request i.e., the first dispatch request sent to the at least one lower priority mobile device.

In one example, assume that the number of mobile devices 120 required for the dispatch is predetermined as 'two' and further assume the count of mobile devices 120 that have accepted the dispatch request is 'three'. In this scenario, the infrastructure controller device 110 may decide to withdraw the dispatch request sent to one of the three mobile devices 120 that have accepted the dispatch request since only two responders are required to be dispatched to the event or incident. In some embodiments, the higher priority mobile device may be dispatched before withdrawing the lower priority mobile device, while in other embodiments, the higher priority mobile device may be dispatched only after withdrawing the lower priority mobile device. The infrastructure controller device 110 transmits a further dispatch request (also referred to as second dispatch request) to the at least one higher priority mobile device requesting dispatch of the corresponding emergency responder to the associated location. In one embodiment, the further dispatch request sent to only the higher priority mobile device may contain additional information which was not included in the first dispatch request sent to each of the first set of mobile devices 120. For example, the additional information may pertain to more specific or detailed information about the event or incident such as map of the location of the event or incident, address, number of casualties, information related to attackers, etc.

Figure 2:
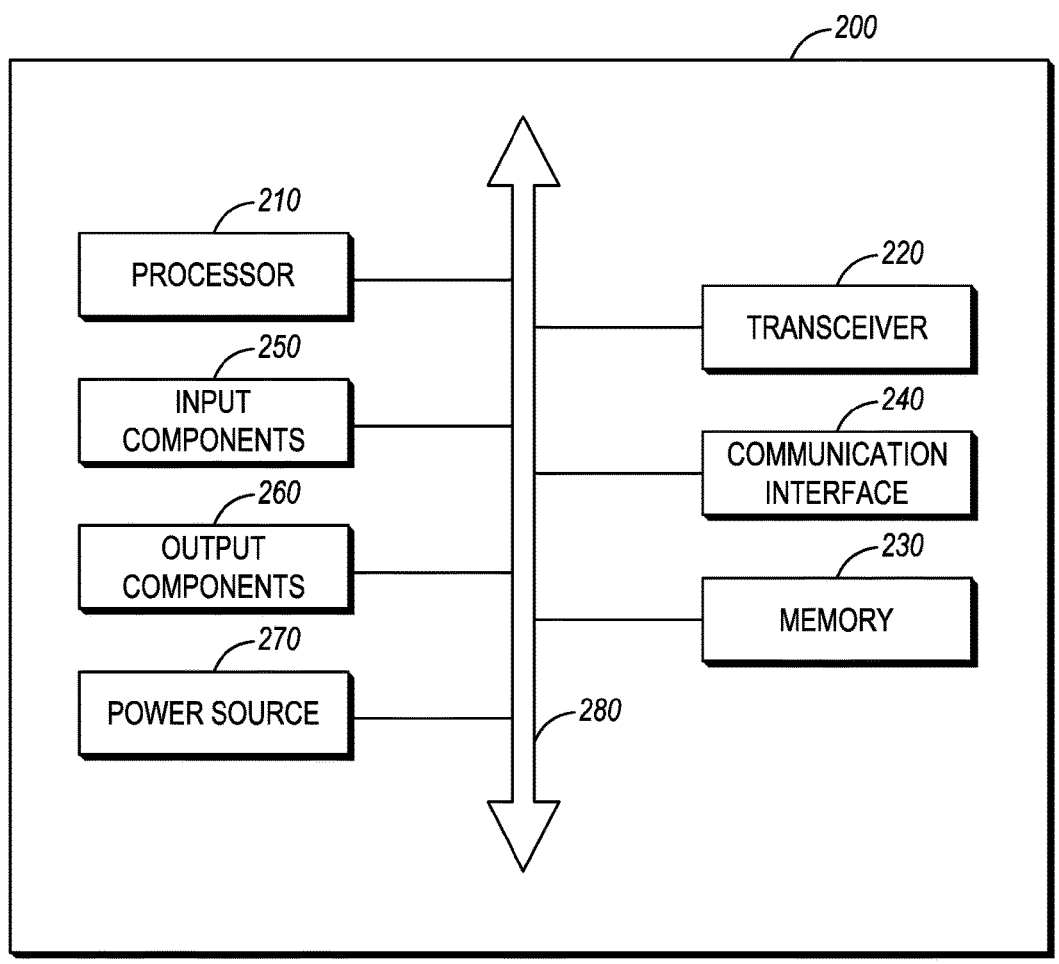
FIG. 2 is a block diagram of an apparatus for operation within the communication system of FIG. 1 in accordance with an embodiment of the present disclosure.

FIG. 2 is a block diagram of an apparatus 200 for operation within the communication system 100 of FIG. 1 in accordance with some embodiments. The apparatus 200, for example, can be implemented in one or more of the communication nodes shown in FIG. 1 such as the infrastructure controller device 110, mobile device 120, and alerting/requesting device 140. The apparatus 200 includes a processor 210, a transceiver 220, a memory 230 for storing operating instructions that are executed by the processor 210, a communication interface 240, input components 250, output components 260, a power source 270, and a communication bus 280. The apparatus 200 is an integrated unit containing at least all the elements depicted in FIG. 2, as well as any other elements necessary for the apparatus 200 for performing functions associated with the corresponding communication node shown in FIG. 1. Alternatively, the apparatus 200 can comprise a collection of appropriately interconnected units or devices, wherein such units or devices perform functions that are equivalent to the functions performed by the elements of the apparatus 200.

The processor 210 includes one or more microprocessors, microcontrollers, DSPs (digital signal processors), state machines, logic circuitry, or any other device or devices that process information based on operational or programming instructions. Such operational or programming instructions (not shown) are stored in the memory 230 and may include programming instructions that, when executed by processor 210, cause the processor 210 to perform one or more of the steps, message transmissions, and message receptions set forth in FIGS. 3-4. The transceiver 220 may be directly wired to another component or utilize wireless technology (for example, when implemented in mobile devices 120) for communication with other communication nodes. The memory 230 of the apparatus 200 is used by the processor 210 to store and retrieve data. The data that is stored by the memory 230 include, but is not limited to operating systems, applications, and data. In one embodiment, the memory 230 maintains the responder information database 150 that is accessible by communication nodes such as the infrastructure controller device 110. The memory 230 can be an IC (integrated circuit) memory chip containing any form of RAM (random-access memory), a floppy disk, a CD-RW (compact disk with read write), a hard disk drive, a DVD-RW (digital versatile disc with read write), a flash memory card, external subscriber identity module (SIM) card or any other medium for storing digital information. One of ordinary skill in the art will recognize that when the processor 210 has one or more of its functions performed by a state machine or logic circuitry, the memory 230 containing the corresponding operational instructions can be embedded within the state machine or logic circuitry.

The communication interface 240 may use transceiver 220 to enable the communication nodes shown in FIG. 1 to communicate with other devices and/or systems. For example, the communication interface 240 may include mechanisms for communicating with another device or system via a network such as the communication network 130. The input components 250 of the apparatus 200 may include an audio input component such as a microphone or a mechanical input component such as a button or key selection sensors, touch pad sensor, touch screen sensor, capacitive sensor, motion sensor, and switch. Likewise, the output components 260 of the apparatus 200 may include a variety of video, audio, and/or mechanical outputs. Other examples of output components 260 include an audio input component such as a speaker, alarm and/or buzzer, and/or mechanical output component such as vibrating or motion-based mechanisms. The apparatus 200 also includes a power source 270, such as a power supply or a portable battery (for example, when implemented in mobile devices 120), for providing power to the other internal components of the apparatus 200. The communication bus 280 includes one or more conventional buses that permit communication among the components of the apparatus 200.

It is to be understood that FIG. 2 is provided for illustrative purposes only and for illustrating components of an apparatus 200 for implementation in one or more communication nodes such as infrastructure controller device 110, mobile devices 120, alerting/requesting device 140, a console associated with the dispatcher 160, or other communication nodes maintaining the responder information database 150. Further, the components illustrated in FIG. 2 is not intended to be a complete schematic of the various components required for functioning of the communication nodes shown in FIG. 1. Therefore, the apparatus 200 may include various other components not shown in FIG. 2, or may include a combination of two or more components or division of a particular component into two or more separate components, and still be within the scope of the present disclosure.

Figure 3:
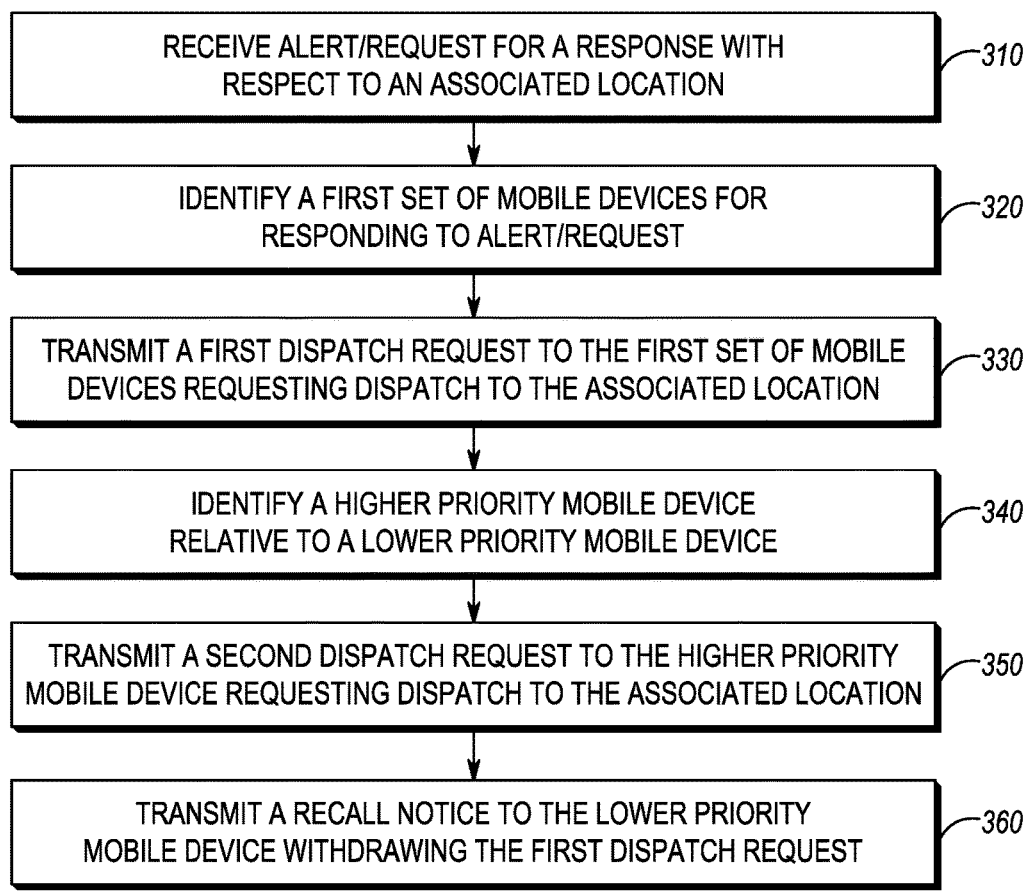
FIG. 3 is a flowchart illustrating a method for automated dispatch of mobile devices in accordance with an embodiment of the present disclosure.

FIG. 3 is a flowchart illustrating a method 300 of operating an infrastructure controller device such as the infrastructure controller device of FIG. 1 for automated dispatch of mobile devices 120 in the communication system 100 in accordance with an embodiment of the present disclosure. At block 310, the infrastructure controller device receives one of an alert and request for a response with respect to an associated location. In one embodiment, the infrastructure controller device receives, via its transceiver, one of the alert and request for the response from the alerting/requesting device 140 shown in FIG. 1. In this embodiment, the alerting/requesting device 140 automatically detects an event or incident that has occurred at a location and triggers/generates the alert or the request for response to be sent to the infrastructure controller device when the event or incident necessitates response services. In one embodiment, the alerting/requesting device 140 receives information about the event or incident from another message source and then triggers/generates the alert or the request for response to be sent to the infrastructure controller device when the incident or event necessitates response services. The alert or request for response may include information pertaining to the alert or request for response such as associated location information, time stamp of occurrence of the event or incident, type of the event or incident, status of the event or incident, etc.

Next at block 320, the infrastructure controller device, in response to receiving one of the alert and request for response with respect to the associated location, identifies a first set of mobile devices 120 for responding to the one of the alert and request. In one embodiment, the infrastructure controller device accesses responder identification parameters for a plurality of mobile devices 120 stored in the responder information database 150 shown in FIG. 1 to identify the first set of mobile devices 120 from the plurality of mobile devices 120. The responder identification parameters for each mobile device 120 assigned to a responder include identification information about the responder and further parameters that can potentially impact the ability of the responder to respond to the one of the alert and request. For example, the responder identification parameters include one or more of location information of a responder associated with the mobile device 120, history of activities of the responder, availability of the responder, rank and role of the responder, etc. In embodiments of the present disclosure, the identification of first set of mobile devices 120 automatically determines which responders should be requested to be dispatched to the associated location in response to the alert or request. In one embodiment, the infrastructure controller device performs a correlation between information pertaining to the received alert or request for response and responder identification parameters to identify responders that are best suited for responding to a particular event or incident corresponding to the received alert or request. For example, when the alert or request for response is received in response to an emergency caused by fire, the infrastructure controller device may identify a mobile device that is assigned to a firefighter, for example, based on a correlation between the cause of the emergency and role of the responder. In one embodiment, the infrastructure controller device may assign a priority level to each mobile device 120 for which responder identification parameters are accessed. The infrastructure controller device may then determine whether the priority level of each mobile device 120 meets a predetermined priority level requirement for responding to the one of the alert and request. Based on this determination for each mobile device 120, the infrastructure controller device adds a mobile device 120 from the plurality of mobile devices 120 to the first set of mobile devices 120 that are selected for requesting dispatch of corresponding responders. For example, when the predetermined priority level requirement necessitates that a responder associated with the mobile device 120 should reach the location of the event or incident within a predefined time frame, the infrastructure controller device adds a particular mobile device 120 to the first set of mobile devices 120 only if the responder associated with the mobile device 120 is determined to be within a predefined geographical area relative to the location (for example, in the vicinity of the location). In another example, the predetermined priority level requirement may necessitate that a responder associated with the mobile device 120 should have a predefined rank, role, skills, experience, or a combination of these requirements.

Next at block 330, the infrastructure controller device transmits, via its transceiver, a first dispatch request to each mobile device 120 in the first set of mobile devices 120 requesting dispatch of the corresponding responder to the associated location. In one embodiment, the infrastructure controller device determines a proposed action that needs to be executed by the responder in response to the dispatch request and includes a request to execute the proposed action in the dispatch request sent to each mobile device 120 in the first set. The proposed action may include one or more actions, for example, requesting the responder to accept the dispatch request, requesting the responder to reach the location associated with the event or incident in a given time frame, requesting the responder to provide additional information, requesting the responder to perform any other tasks associated with response services, etc. In response to this request, the infrastructure controller device may receive response to the dispatch request from some or all of the mobile devices 120 in the first set. The response received from each mobile device 120 may include either an acceptation or rejection to execute the proposed action. In one embodiment, the infrastructure controller device sets a timer when the dispatch request is transmitted to the first set of mobile devices 120 and discards any response received from the mobile devices 120 after the expiry of the timer.

In one embodiment, when the infrastructure controller device receives an acceptation to execute the proposed action from more than a predetermined number of mobile devices 120 required for responding to the received alert or request, either at the time of the request or any time thereafter, the infrastructure controller device, as shown in block 340 identifies at least one higher priority mobile device relative to at least one lower priority mobile device from a list of mobile devices 120 which responded to the dispatch request with an acceptation to execute the proposed action. In one embodiment, the infrastructure controller device identifies a subset of mobile devices 120, wherein the response to the first dispatch request received from each mobile device 120 in the subset includes the acceptation to execute proposed action. In another embodiment, the infrastructure controller device includes a mobile device 120 in the subset of mobile devices 120 only if the corresponding response with the acceptation to execute the proposed action is received from the mobile device 120 prior to the expiry of the timer. In these embodiments, the infrastructure controller device further determines whether a count of mobile devices 120 in the subset exceed the predetermined number. In one example, when the count of mobile devices 120 exceeds the predetermined number, the infrastructure controller device further identifies which of the mobile devices 120 in the subset can be sent a recall notice to withdraw the first dispatch request. In one embodiment, the identification of mobile devices 120 for this purpose is performed on the basis of the priority level of each mobile device 120 in the subset. For example, the infrastructure controller device identifies a priority level for each mobile device 120 in the subset and compares the priority level of each mobile device 120 in the subset with other mobile devices 120 in the subset. In one embodiment, prior to comparing the priority level of the mobile devices 120 in the subset with each other, the infrastructure controller device updates the priority level of each mobile device 120 in the subset based on a time stamp of receiving the response to the first dispatch request from the corresponding mobile device 120. For example, the time stamp may determine which mobile devices 120 have responded to the dispatch request at the earliest or before the expiry of the timer. Accordingly, the priority level of the mobile devices 120 may be determined on the basis of the time stamp of receiving the response to the first dispatch request. In one embodiment, the infrastructure controller device also updates the priority level of one or more mobile devices 120 in the subset when the response to the first dispatch request received from the corresponding one or more mobile devices 120 in the subset includes additional information other than the acceptation to execute the proposed action. For example, the additional information other than the acceptation to execute the proposed action that is received in response to the dispatch request includes one or more of an estimate of reaction time of a responder associated with the responder device, current location of the responder, availability of the responder, rank and role of the responder, historical activities of the responder, and any other information that potentially impacts ability of the responder to respond to the alert.

Based on the comparison of the priority levels of the mobile devices 120 in the subset, the infrastructure controller device identifies from the subset, at least one higher priority mobile device relative to at least one lower priority mobile device based on the comparison as shown in block 340. In this example, a count of the at least one higher priority mobile device is such that it is equal to the predetermined number i.e., the number of higher priority mobile devices selected for further dispatch request (a second dispatch request) is equal to the predetermined number of mobile devices required for providing response services to the alert or request. Further, in the above example, a count of the at least one lower priority mobile device is such that it is equal to a number exceeding the predetermined number. The lower priority devices selected for recall notice withdrawing the first dispatch request are mobile devices 120 that are not required for provided response services to the alert or request as the responses are received from more than the predetermined number of mobile devices 120.

Next, at block 350, the infrastructure controller device transmits, via the transceiver 220, a second dispatch request to the at least one higher priority mobile device requesting dispatch of the corresponding responder to the associated location. In one embodiment, the second dispatch request sent to only the at least one higher priority mobile device may contain additional information which was not included in the first dispatch request sent to each of the first set of mobile devices 120. For example, the additional information may pertain to more specific or detailed information about the event or incident such as map of the location of the event or incident, address, medical condition of a patient, number of casualties, information related to attackers. In one embodiment, the second dispatch request may include a request to execute a proposed action which was not included in the first dispatch request. For example, the proposed action included in the first dispatch request may be a request to acknowledge the first dispatch request, and the proposed action included in the second dispatch request may be a more specific request, for example, a request for the responder to reach a particular location associated with the alert or request or a request for the responder to reach the location within a predefined time frame.

Next, at block 360, the infrastructure controller device transmits, via the transceiver 220, a recall notice to the at least one lower priority mobile device withdrawing the first dispatch request. In one embodiment, the recall notice includes an indication to the lower priority mobile device to not execute or stop executing the proposed action that was requested in the first dispatch request. For example, the proposed action included in the first dispatch request may be a request for the responder to provide a particular response service, for example, reaching a location associated with the alert or request. In this example, the recall notice may include an indication to the lower priority mobile device that the corresponding responder is not required to provide the particular response service i.e., not required to reach the location associated with the alert or request.

In one embodiment, the infrastructure controller device refrains from transmitting the recall notice to the at least one lower priority mobile device in the first set of mobile devices 120 and transmits the second dispatch request to both the at least one high priority mobile device and at least one lower priority mobile device requesting dispatch to the association location. This embodiment is carried out by the infrastructure controller device when the count of mobile devices 120 that responded with an acceptation to execute the proposed action included in the first dispatch request is less than the predetermined number of mobile devices 120 required for responding to the alert or request. For example, when the infrastructure controller device receives an acceptation to execute the proposed action from a number of mobile devices 120 that are less than the predetermined number required for responding to the alert or request, the infrastructure controller device sends the second dispatch request to each of the responding mobile devices 120 without any consideration of the priority levels of the responding mobile devices 120. In one embodiment, when a count of mobile devices 120 that responded with an acceptation to execute the proposed action included in the first dispatch request is less than the predetermined number of mobile devices 120 required for responding to the alert or request, one or more operations shown in blocks 340, 350, and 360 may not be performed by the infrastructure controller device. In another embodiment, when the count of mobile devices 120 that responded with an acceptation to execute the proposed action included in the first dispatch request is less than the predetermined number of mobile devices 120 required for responding to the alert or request, the infrastructure controller device revises (for example, reduces) the priority level requirements for responding to the alert or request and transmits the first dispatch request to a new set of mobile devices 120 that meets the revised priority level requirements. In one embodiment, the infrastructure controller device repeats the process of revising the priority level requirements and transmitting the first dispatch request to a new set of mobile devices 120 till the response with an acceptation to execute the proposed action is received from at least a predetermined number of mobile devices 120 required for responding to the one of the alert and request for response. In one embodiment, the infrastructure controller device notifies, via the transceiver 220, the response received from each mobile device 120 in the subset to the alerting/requesting device 140 and optionally to the dispatcher 160. In one embodiment, the infrastructure controller device notifies, via the transceiver 220, the response received from only the at least one higher priority mobile device to the alerting/requesting device 140 and optionally to the dispatcher 160.

Figure 4:
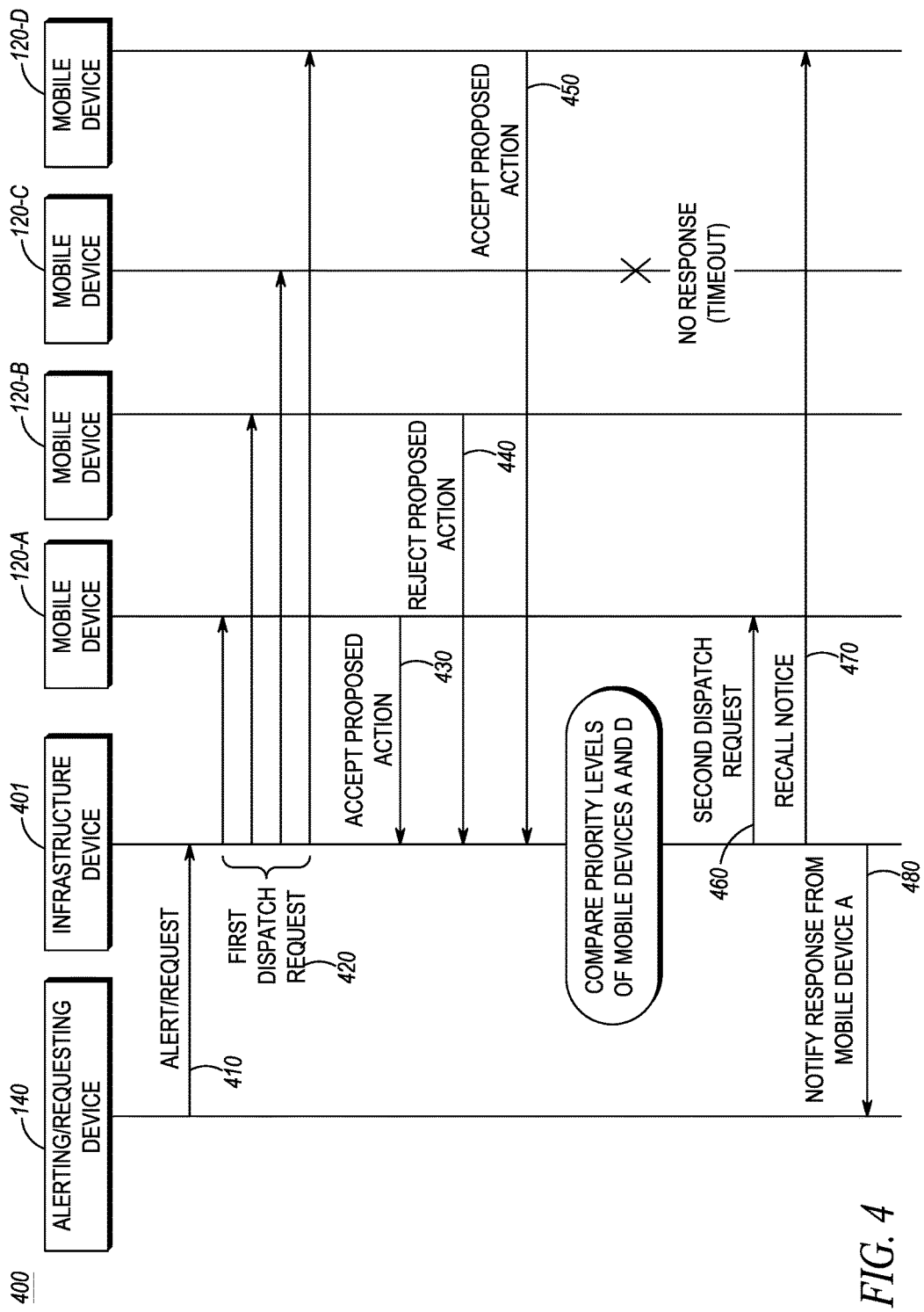
FIG. 4 is a message flow diagram illustrating the exchange of messages associated with the automated dispatch of mobile devices in accordance with an embodiment of the present disclosure.

FIG. 4 is a message flow diagram 400 illustrating a flow of messages associated with the automated dispatch of mobile devices 120 by an infrastructure controller device 401, which may be the same or similar to the infrastructure controller device 110 in the communication system 100 of FIG. 1. In FIG. 4, the infrastructure controller device 401 is shown to be communicating with the alerting/requesting device 140 and four different mobile devices 120-A, 120-B, 120-C, and 120-D (120-A-D), each of which may be same or similar to mobile devices 120 of FIG. 1. The alerting/requesting device 140 sends one of an alert and request for response 410 to the infrastructure controller device 401. In response to one of the alert and request for response 410, the infrastructure controller device 401 identifies a first set of mobile devices 120, for example, mobile devices 120-A-D for responding to the one of the alert and request for response 410. The infrastructure controller device 401 then transmits the first dispatch request 420 to each of the mobile devices 120-A-D in the first set. The first dispatch request 420 includes a request to execute a proposed action to each of the mobile devices 120-A-D. In accordance with some embodiments of the present disclosure, each mobile device 120-A-D, in response to receiving the first dispatch request 420, indicates the received dispatch request to the corresponding responder via one or more output components 260 shown in FIG. 2. For example, the mobile device 120 may display the received request on a graphical user interface (GUI) to allow the responder to input his response via one or more input components 250 shown in FIG. 2. In one embodiment, the input from the responder may be either an acceptation or rejection to execute the proposed action. In one embodiment, the GUI of each mobile device 120-A-D may also allow the user to input additional information other than the acceptation or rejection to execute the proposed action. Such additional information is also included in the response to the dispatch request.

In the example shown in FIG. 4, the mobile devices 120-A, 120-D send responses 430 and 450, respectively, with an acceptation to execute the proposed action. In one embodiment, the acceptation to execute the proposed action is indicated in the responses 430, 450 by an acknowledgment, for example, a positive acknowledgment. The mobile device 120-B sends a response 440 with a rejection to execute the proposed action. In one embodiment, the rejection to execute the proposed action is indicated in the response with an acknowledgment, for example, a negative acknowledgment. In one embodiment, the absence of a response from a mobile device before the expiry of a timer indicates a rejection to execute the proposed action. In the example shown in FIG. 4, there is no response to the first dispatch request 420 from the mobile device 120-C. The infrastructure controller device 401 then identifies or updates priority levels for the mobile devices 120-A, 120-D that responded to the first dispatch request 420 with the acceptation to execute to the proposed action. In this example, assume that the infrastructure controller device 401 determines that only one responder is required for responding to the received alert/request for response 410. Accordingly, the infrastructure controller device 401 compares the priority level of the mobile devices 120-A, 120-D and selects a higher priority mobile device relative to a lower priority mobile device. For example, the priority level for mobile devices 120-A, 120-D may be established based on the relative distances of the mobile devices 120-A, 120-D from the location of the event or incident corresponding to the received alert/request for response 410. In this example, the infrastructure controller device 401 selects the mobile device 120-A as the higher priority mobile device and the mobile device 120-D as the lower priority mobile device.

The infrastructure controller device 401 sends a second dispatch request 460 to the mobile device 120-A. In one embodiment, the second dispatch request 460 includes more specific or detailed information about the event or incident which was not previously included in the first dispatch request 420. Subsequently, the infrastructure controller device 401 sends a recall notice 470 to the mobile device 120-D withdrawing the first dispatch request 420 which was previously sent to the mobile device 120-D. In one embodiment, the recall notice 470 includes an indication to the mobile device 120-D to stop executing the proposed action which was earlier accepted by the mobile device 120-D by sending the response 450. The infrastructure controller device 401 also sends a notification 480 to the alerting/requesting device 140. In one embodiment, the notification 480 sent to the alerting/requesting device 140 includes a list of mobile devices 120 and identification of corresponding responders who are expected to be dispatched to the location associated with one of the alert and request for response 410. In one embodiment, the notification 480 includes responses received from only the higher priority mobile devices, for example, as shown in FIG. 4, response 430 received from the mobile device 120-A.

Embodiments of the present disclosure described herein may be applied to emergency communication systems to automate dispatch requests sent to mobile devices of responders without manual intervention of the dispatchers. Embodiments of the present disclosure utilize an infrastructure controller device to automate dispatch requests sent to mobile devices. This automation of dispatch requests sent to mobile devices eliminates the need for a dispatcher or alternatively reduces the workload of a dispatcher employed in emergency communication systems. Embodiments of the present disclosure also allows the responders to either accept or reject a request to execute a proposed action in relation to the alert or request for response received with respect to an event or incident. This implementation of allowing the responder to either accept or reject the request to execute the proposed action reduces the risk of total automation associated with the automated dispatch requests sent to the mobile devices of responders. Embodiments of the present disclosure also classify mobile devices of responders who have accepted the proposed action as higher priority mobile devices and lower priority mobile devices. This classification allows the infrastructure controller device to send a subsequent dispatch request to higher priority mobile devices confirming the previous dispatch request and a recall notice to lower priority mobile devices withdrawing the previous dispatch request. This act of withdrawing dispatch requests sent to lower priority mobile devices ensures that only a required number of responders (or responders corresponding to higher priority mobile devices) are dispatched to the location of an event or incident. Embodiments of the present disclosure also help in rapidly mobilizing the responders for dispatch to the location of the event or incident as there is significant reduction of time delay between the notification of alert/request for response and subsequent dispatch requests or recall notice sent to the mobile devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for automated dispatch of mobile devices, the method comprising:
   receiving, at an infrastructure controller device, one of an alert and request for a response to an incident at an associated location;
   identifying, by the infrastructure controller device, a first set of a plurality of mobile devices for responding to the one of the alert and request;
   transmitting, by the infrastructure controller device, a first dispatch request to each mobile device in the first set requesting dispatch to the incident at the associated location;
   receiving, by the infrastructure controller device and from a first subset of some or all of the first set of the plurality of mobile devices, an acceptance of the first dispatch request;
   subsequently determining, by the infrastructure controller device, that a number of mobile devices in the first subset accepting dispatch to the incident at the associated location is greater than a determined number of mobile devices required for responding to the incident at the associated location, and responsively:
     identifying, by the infrastructure controller device, at least one higher priority mobile device in the first subset accepting dispatch to the incident at the associated location relative to at least one lower priority mobile device in the first subset accepting dispatch to the incident at the associated location; and
     transmitting, by the infrastructure controller device, a recall notice to the at least one lower priority mobile device withdrawing the first dispatch request requesting dispatch to the incident at the associated location to the at least one lower priority mobile device.

2. The method of claim 1, wherein the first dispatch request comprises a request to execute a proposed action for responding to the incident at the associated location, the method further comprising:
   transmitting, by the infrastructure controller device, a second dispatch request to the at least one higher priority mobile device including additional information for responding to the incident at the associated location.

3. The method of claim 2, further comprising:
   receiving, by the infrastructure controller device and from a second subset of some or all of the first set of the plurality of mobile devices, a rejection of the first dispatch request.

4. The method of claim 3, wherein a count of the at least one lower priority mobile device is equal to the number of mobile devices in the first subset exceeding the determined number of mobile devices required for responding to the incident.

5. The method of claim 3, wherein the one of the alert and request is received from an alerting/requesting device, the method further comprising:

notifying, by the infrastructure controller device, the response received from each mobile device accepting or rejecting the first dispatch request to the alerting/requesting device.

6. The method of claim 1, wherein prior to identifying the at least one higher priority mobile device in the first subset, the method further comprising:
updating priority levels of one or more mobile devices in the first subset in response to the first dispatch request received from the corresponding one or more mobile devices including additional information other than the acceptation to execute the proposed action.

7. The method of claim 1, wherein identifying the first set of mobile devices comprises:
accessing responder identification parameters corresponding to a plurality of mobile devices;
assigning a priority level to each of the plurality of mobile devices based on a correlation between information pertaining to the one of the alert and request and responder identification parameters; and
adding a mobile device from the plurality of mobile devices to the first set of mobile devices when the priority level of the mobile device meets priority level requirements determined for responding to the one of the alert and request.

8. The method of claim 1, wherein identifying the at least one higher priority mobile device in the first subset relative to at least one lower priority mobile device in the first subset comprises, responsive to determining that the number of mobile devices in the first subset accepting dispatch to the incident at the associated location is greater than the determined number of mobile devices required for responding to the incident at the associated location, using additional information provided to the infrastructure controller device by the mobile devices in the first subset to relatively rank the at least one higher priority mobile device in the first subset relative to at least one lower priority mobile device in the first subset.

9. The method of claim 1, wherein prior to identifying the at least one higher priority mobile device in the first subset, the method further comprising:
updating priority levels of each mobile device in the first subset based on a time stamp of receiving the response to the first dispatch request from the corresponding mobile device.

10. An apparatus for automating dispatch of mobile devices, the apparatus comprising:
a processor;
a transceiver for transmitting and receiving data; and
a memory for storing program instructions, wherein executing the program instructions by the processor causes the apparatus to:
receive, via the transceiver, one of an alert and request for a response to an incident at an associated location;
identify a first set of a plurality of mobile devices for responding to the one of the alert and request;
transmit, via the transceiver, a first dispatch request to each mobile device in the first set requesting dispatch to the incident at the associated location;
receive, via the transceiver and from a first subset of some or all of the first set of the plurality of mobile devices, an acceptance of the first dispatch request;
subsequently determine that a number of mobile devices in the first subset accepting dispatch to the incident at the associated location is greater than a determined number of mobile devices required for responding to the incident at the associated location, and responsively:
identify, at least one higher priority mobile device in the first subset accepting dispatch to the incident at the associated location relative to at least one lower priority mobile device in the first subset accepting dispatch to the incident at the associated location; and
transmit, via the transceiver, a recall notice to the at least one lower priority mobile device withdrawing the first dispatch request requesting dispatch to the incident at the associated location to the at least one lower priority mobile device.

11. The apparatus of claim 10, wherein the first dispatch request comprises a request to execute a proposed action for responding to the incident at the associated location, and wherein executing the program instructions by the processor further causes the apparatus:
transmit, via the transceiver, a second dispatch request to the at least one higher priority mobile device including additional information for responding to the incident at the associated location.

12. The apparatus of claim 11, wherein the program instructions are executed by the processor to cause the apparatus to further:
receive, via the transceiver, and from a second subset of some or all of the first set of the plurality of mobile devices, a rejection of the first dispatch request.

13. The apparatus of claim 12, wherein a count of the at least one higher priority mobile device is equal to the number of mobile devices in the first subset exceeding the determined number of mobile devices required for responding to the incident.

14. The apparatus of claim 10, wherein executing the program instructions by the processor further causes the apparatus to identify the at least one higher priority mobile device in the first subset relative to at least one lower priority mobile device in the first subset, responsive to determining that the number of mobile devices in the first subset accepting dispatch to the incident at the associated location is greater than the determined number of mobile devices required for responding to the incident at the associated location, by using additional information provided to an infrastructure controller device by the mobile devices in the first subset to relatively rank the at least one higher priority mobile device in the first subset relative to at least one lower priority mobile device in the first subset.

15. The apparatus of claim 10, wherein prior to identifying the at least one higher priority mobile device in the first subset, executing the program instructions by the processor further causes the apparatus:
update priority levels of each mobile device in the first subset based on a time stamp of receiving the response to the first dispatch request from the corresponding mobile device.

16. The apparatus of claim 10, wherein prior to identifying the at least one higher priority mobile device in the first subset, executing the program instructions by the processor further causes the apparatus:
update priority levels of one or more mobile devices in the first subset in response to the first dispatch request received from the corresponding one or more mobile devices including additional information other than the acceptation to execute the proposed action.

17. A communication system, comprising:
- an alerting/requesting device for signaling one of an alert and request for response with respect to an incident at an associated location;
- a plurality of mobile devices;
- a communication network; and
- an infrastructure controller device communicatively coupled to the alerting/requesting device and the plurality of mobile devices via the communication network,
- wherein the infrastructure controller device is configured to, in response to receiving one of the alert and request from the alerting/requesting device:
  - identifies a first set of a plurality of mobile devices from the plurality of mobile devices for responding to the incident at the associated location;
  - transmits a first dispatch request to each mobile device in the first set requesting dispatch to the incident at the associated location;
  - receives, from a first subset of some or all of the first set of the plurality of mobile devices, an acceptance of the first dispatch request;
  - subsequently determines that a number of mobile devices in the first subset accepting dispatch to the incident at the associated location is greater than a determined number of mobile devices required for responding to the incident at the associated location, and responsively:
    - identifies, at least one higher priority mobile device in the first subset accepting dispatch to the incident at the associated location relative to at least one lower priority mobile device in the first subset accepting dispatch to the incident at the associated location; and
    - transmits a recall notice to the at least one lower priority mobile device withdrawing the first dispatch request requesting dispatch to the incident at the associated location to the lower priority mobile device.

18. The communication system of claim 17, further comprising:
- a database operatively connected to the infrastructure controller device, the database comprising responder identification parameters for the plurality of mobile devices, wherein the infrastructure controller device accesses the responder identification parameters in the database to identify the first set of mobile devices.

19. The communication system of claim 17, wherein the infrastructure controller device is further configured to, prior to identifying the at least one higher priority mobile device in the first subset:
- update priority levels of each mobile device in the first subset based on a time stamp of receiving the response to the first dispatch request from the corresponding mobile device.

20. The communication system of claim 17, wherein the infrastructure controller device is further configured to, prior to identifying the at least one higher priority mobile device in the first subset:
- update priority levels of one or more mobile devices in the first subset in response to the first dispatch request received from the corresponding one or more mobile devices including additional information other than the acceptation to execute the proposed action.

* * * * *